(No Model.)

C. PRAHL.
FINGER RING.

No. 297,446. Patented Apr. 22, 1884.

WITNESSES:
Jos. N. Rosenbaum.
Martin Petry.

INVENTOR
Charles Prahl
BY Gospel & Raegener
ATTORNEYS.

UNITED STATES PATENT OFFICE.

CHARLES PRAHL, OF CRANFORD, NEW JERSEY, ASSIGNOR TO STERNE BROTHERS & CO., OF NEW YORK, N. Y.

FINGER-RING.

SPECIFICATION forming part of Letters Patent No. 297,446, dated April 22, 1884.

Application filed March 7, 1884. (No model.)

*To all whom it may concern:*

Be it known that I, CHARLES PRAHL, of Cranford, Union county, State of New Jersey, have invented certain new and useful Improvements in Finger-Rings, of which the following is a specification.

The object of this invention is to furnish an improved finger-ring, the shank of which can be made larger or smaller, so as to be accurately adjusted by a simple and convenient mechanism to different thicknesses of fingers; and the invention consists of a finger-ring the box of which is made of two parts—of a fixed lower portion and of an upper axially-turning portion, the latter being provided with a central screw-post that turns in a socket of the lower portion. The shank of the ring is provided with slotted and overlapping ends, that are guided along the screw-socket of the box portion and tightly clamped thereto by the upper box portion, after they have been adjusted to the finger. A stop device limits the motion of the upper box portion.

Figure 1:
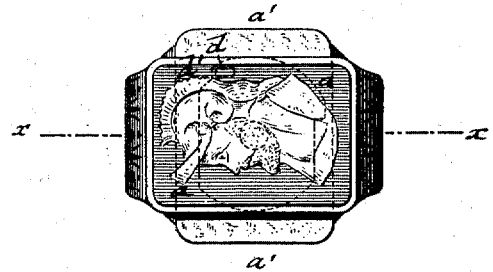
Figure 2:
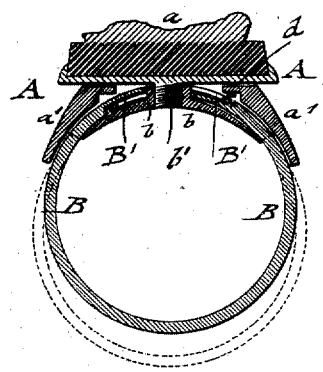
Figure 3:
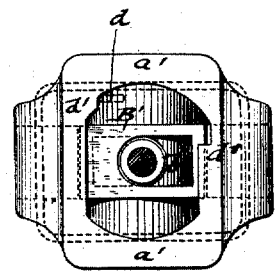

In the accompanying drawings, Figure 1 represents a front view of my improved finger-ring, showing the upper portion turned on its axis at right angles to the lower portion, so as to admit the adjustment of the shank of the ring. Fig. 2 is a vertical transverse section of the same on line $x$ $x$, Fig. 1; and Fig. 3 is a front view of the ring, partly in section, with the upper box portion removed.

Similar letters of reference indicate corresponding parts.

A in the drawings represents the box of my improved finger-ring, which box is made of an upper portion, $a$, and of a lower portion, $a'$, the upper box portion, $a$, carrying the cameo, onyx, or other ornamental stone, while the lower box portion, $a'$, is provided with side guide-openings for inserting the ends B' of the shank B. The ends B' of the shank B, inside of the lower box portion, $a'$, are slotted and made so as to overlap each other, as shown in Fig. 2. The slotted ends of the shank B are guided along a screw-socket, $b$, of the lower box portion, $a'$. A central screw-post, $b'$, of the upper box portion screws into the socket $b$. By turning the upper box portion, $a$, on its axis in one or the opposite direction the slotted overlapping ends B' of the shank B are either tightly clamped by the box portion $a$ or released from each other. When they are released from the pressure of the box portion $a$, the shank B may be adjusted for a greater or smaller diameter, so as to fit any required size of finger. When this is accomplished, the upper box portion, $a$, is returned into normal position on the lower box portion, $a'$, so that the ends of the shank are firmly clamped between the box portions $a$ $a'$, as in Fig. 2. The upper box portion, $a$, is provided with a downwardly-projecting stop-pin, $d$, (shown in dotted lines in Figs. 1 and 3,) which abuts against projections $d'$ of the lower box portion, $a'$, whereby the axial motion of the upper box portion, $a$, is limited to an angle of ninety degrees. When the same is turned from its normal position into a position at right angles thereto, as shown in Fig. 1, the stop-pin $d$ abuts against one of the projections $d'$. In this position the slotted ends of the shank are released and the shank can be adjusted. By returning the upper box portion into normal position the shank ends are securely clamped. By this means a convenient means of adjusting finger-rings to any required size of finger, whether large or small, is obtained, whereby the same are adapted to be used for any size of finger, so that jewelers are not compelled to keep a large number of rings in stock, while still being able to meet the wants of their customers.

Having thus described my invention, I claim as new and desire to secure by Letters Patent—

1. The combination, in a finger-ring, of a lower box portion, an axially-turning upper box portion, and a shank the ends of which are guided in the lower box portion, and adapted to be tightly clamped by the upper box portion, substantially as set forth.

2. The combination, in a finger-ring, of a lower box portion, a shank the ends of which are guided in the lower box portion, an axially-turning upper box portion adapted to clamp the ends of the shank, and means whereby the extent of axial motion of the upper box portion is limited, substantially as set forth.

3. In a finger-ring, the combination of the lower box portion, $a'$, having a screw-socket, $b$, an adjustable shank, B, having slotted and overlapping ends B′, and an upper box portion, $a$, having a central screw-post, $b'$, fitting into the socket of the lower box portion, so that the shank ends are tightly clamped or released, substantially as set forth.

4. In a finger-ring, the combination of the lower box portion, $a'$, having a central screw-socket, $b$, an adjustable shank, B, having slotted and overlapping ends B′, guided in said lower box portion, an axially-turning upper box portion having a central screw-post, $b'$, and a downward-projecting stop-pin, $d$, and abutments $d'$ of the lower box portion, substantially as set forth.

In testimony that I claim the foregoing as my invention I have signed my name in presence of two subscribing witnesses.

CHARLES PRAHL.

Witnesses:
PAUL GOEPEL,
SIDNEY MANN.

Correction in Letters Patent No. 297,446.

It is hereby certified that in Letters Patent No. 297,446, granted April 22, 1884, upon the application of Charles Prahl, of Cranford, New Jersey, for an improvement in "Finger-Rings," the name of the assignees was written and printed "Sterne, Brothers & Co.;" that said name should have been written and printed *Stern, Brothers & Co.;* and that the proper correction has been made in the files and records pertaining to the case in the Patent Office, and should be read in the Letters Patent to make the same conform thereto.

Signed, countersigned, and sealed this 29th day of April, A. D. 1884.

[SEAL.]

M. L. JOSLYN,
*Acting Secretary of the Interior.*

Countersigned:
    BENJ. BUTTERWORTH,
        *Commissioner of Patents.*